US012749077B1

(12) United States Patent
Harman et al.

(10) Patent No.: US 12,749,077 B1

(45) **Date of Patent: *Sep. 29, 2026**

(54) SELF-SERVICE PAYMENT CARD SECURITY SYSTEM

(71) Applicant: United Services Automobile Association (USAA), San Antonio, TX (US)

(72) Inventors: Nathan Scott Harman, Aubrey, TX (US); Ashley Nicole Munoz, Frisco, TX (US); Matthew David LaBrenz, Lewisville, TX (US); Mark Jeffrey Wallace, Little Elm, TX (US); Bryan Leonard Bain, San Antonio, TX (US); William Daniel Farmer, Carrollton, TX (US); James Edward Finley, Jr., McKinney, TX (US); Arthur Vajirasarn, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 63 days.

This patent is subject to a terminal disclaimer.

(21) Appl. No.: 18/735,982

(22) Filed: Jun. 6, 2024

Related U.S. Application Data

(63) Continuation of application No. 17/366,416, filed on Jul. 2, 2021, now Pat. No. 12,033,149, which is a continuation of application No. 15/914,743, filed on Mar. 7, 2018, now Pat. No. 11,055,711.

(60) Provisional application No. 62/468,769, filed on Mar. 8, 2017.

(51) Int. Cl.
*G06Q 20/40* (2012.01)
*G06Q 20/34* (2012.01)

(52) U.S. Cl.
CPC .......... *G06Q 20/401* (2013.01); *G06Q 20/34* (2013.01)

(58) Field of Classification Search
CPC ........................... G06Q 20/401; G06Q 20/34
USPC ........................................................ 705/44
See application file for complete search history.

(56) References Cited

U.S. PATENT DOCUMENTS 11,354,673 B1 * 6/2022 Brock ................ G06Q 20/4018
2007/0194113 A1 * 8/2007 Esplin .................... G06Q 20/40 705/16
2008/0166997 A1 * 7/2008 Sun ....................... H04M 15/68 455/406

(Continued)

*Primary Examiner* — Hai Tran

(74) *Attorney, Agent, or Firm* — Fletcher Yoder, P.C.

(57) ABSTRACT

A payment card security system includes a payment card provider account system communicatively coupled to a payment card transaction device and a mobile device. The payment card transaction device sends an indication that a payment card is being used to perform a transaction. The payment card provider account system includes processors that receive the indication that the payment card is being used to perform the transaction from the payment card transaction device. The processors also send a notification indicating that the payment card is being used to perform the transaction. The processors further enable authorization of the transaction via the mobile device. In this manner, the payment card security system may prevent or reduce the occurrence of suspicious transactions as they are occurring, rather than waiting until after they have occurred.

20 Claims, 4 Drawing Sheets

(56) References Cited

U.S. PATENT DOCUMENTS

2009/0254463 A1* 10/2009 Tomchek ........... G06Q 30/0283
705/400
2010/0274678 A1 10/2010 Rolf et al.
2016/0189123 A1* 6/2016 Lucia Specogna ..........................
G06Q 20/1085
705/43
2022/0012740 A1* 1/2022 Bacastow ............ G06Q 20/405

* cited by examiner

SELF-SERVICE PAYMENT CARD SECURITY SYSTEM

CROSS-REFERENCE TO RELATED APPLICATION

This application is a continuation of U.S. patent application Ser. No. 17/366,416, entitled "Self-Service Payment Card Security System," which was filed Jul. 2, 2021, which is a continuation of U.S. patent application Ser. No. 15/914,743, entitled "Self-Service Payment Card Security System," which was filed Mar. 7, 2018, now U.S. Pat. No. 11,055,711, issued Jul. 6, 2021, which claims priority to and the benefit of U.S. Provisional Patent Application No. 62/468,769, entitled "Self-Service Payment Card Security System," filed Mar. 8, 2017, each of which is hereby incorporated by reference in its entirety.

BACKGROUND

The present disclosure relates generally to payment cards, and more particularly to self-service systems and methods for securing payment cards.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Payment cards (e.g., credit cards, debit cards, automated teller machine (ATM) cards, and the like) have made it more convenient for users to make purchases of goods and services. However, with the increased use of payment cards, security issues (e.g., fraud, hacking, and cyber attacks) relating to the payment cards have also increased in variety and frequency.

In some instances, a payment card provider may enable a user or accountholder to disable or temporarily disable a payment card. However, the user may typically not disable the payment card until suspicious activity involving the payment card has already occurred. As such, the user may have already been a victim of fraud, hacking, identity theft, and the like, by the time the user disables the payment card. Additionally, after the user disables the payment card, the user may forget that they have disabled the payment card, and attempt to use the disabled payment card to perform a transaction. The transaction may be rejected, inconveniencing and, possibly embarrassing, the user.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates generally to payment cards, and more particularly to self-service systems and methods for securing payment cards. A payment card provider may enable a user or accountholder to disable or temporarily disable a payment card. In some embodiments, a payment card security system may notify the user when the payment card is being used and enable authorization of the transaction. In this manner, the user may stop suspicious transactions as they are occurring, rather than after they have occurred. Additionally, in some embodiments, when the user disables the payment card and the payment card security system receives an indication that the user is near a location where the user may use or is likely to use the payment card (e.g., a grocery store, a gas station, and the like), the payment card security system may notify the user that the payment card is disabled. In this manner, the user may avoid the inconvenience and possible embarrassment of a rejected transaction using the disabled payment card.

Figure 1:
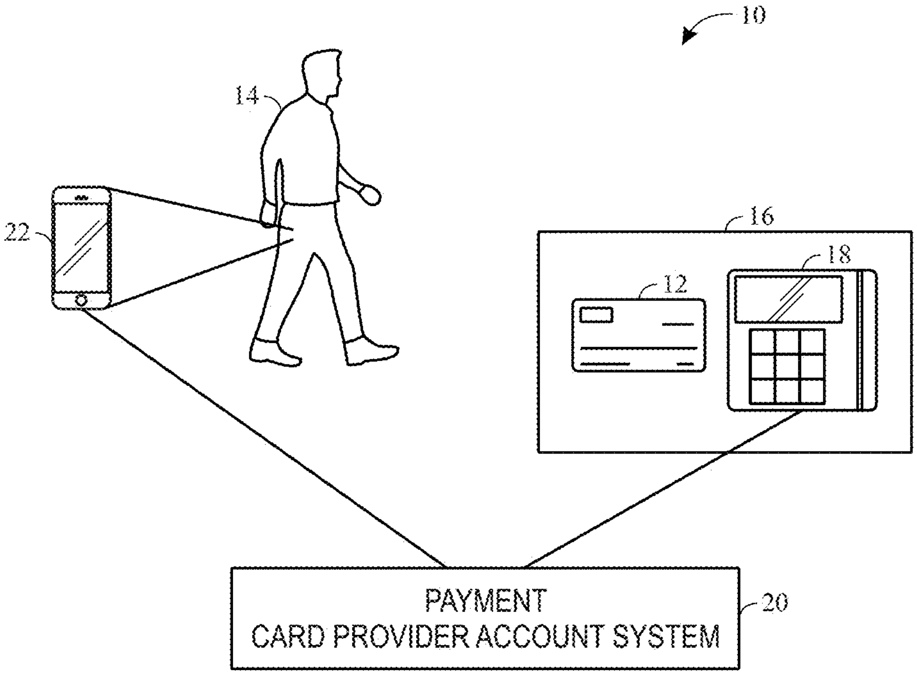
FIG. 1 is a diagram of a payment card security system, in accordance with an embodiment of the present disclosure.

With the foregoing in mind, FIG. 1 is a diagram of a payment card security system 10, in accordance with an embodiment of the present disclosure. A payment card 12 (e.g., credit card, debit card, automated teller machine (ATM) card, and the like) of a user 14 is used to perform a transaction. The transaction may be payment for goods or services. For instance, the transaction may occur at a grocery store 16, retail store, gas station, and the like, by using a payment card transaction device 18 (e.g., a point of sale (POS) terminal). In some embodiments, the transaction may be performed by using account information associated with the payment card 12 instead of using the physical payment card 12. For example, an account number associated with the payment card 12 may be used to perform an online transaction. Further reference to using the payment card 12 to perform a transaction includes using the account number associated with the payment card 12 (e.g., when performing an online transaction), even though the physical payment card 12 may not be used or present.

The transaction may be performed by sending account information associated with the payment card 12 to a payment card provider account system 20. For example, the payment card transaction device 18 may send a credit card number, a card expiration date, a billing address, a card security code (e.g., a Card Verification Value (CVV)), and/or a payment amount to the payment card provider account system 20. In some cases, the account information may be sent to any number of intermediary parties before reaching the payment card provider. For the purposes of this disclosure, the payment card provider may include a payment card network or association member that operates networks for processing payment card payments, an issuing bank or payment card issuer that issued the payment card 12, and the like. The intermediary parties may include an acquiring bank or merchant's bank (i.e., a bank of the merchant selling the goods or services), an acquiring processor or service provider (i.e., a processor that provides a service or device enabling the merchant to accept credit cards), and the like. The payment card provider account system 20 may include one or more computing devices (e.g., servers, desktop computers, and the like) of a payment card provider that manage accounts of users. The account information may be sent wirelessly (e.g., via the Internet, a phone line, and the like).

Before or while authenticating and/or authorizing the transaction, the payment card provider account system 20 may notify the user 14 that a transaction is being attempted using the payment card 12. The notification may be sent wirelessly (e.g., via the Internet, a phone line, and the like) to a communication device of the user 14. As illustrated, the user 14 has a mobile device 22 (e.g., a smartphone). It should be understood that the mobile device 22 is an example, and any suitable communication device (e.g., a wearable device, a tablet, a laptop, a personal computer, a smart television, and the like) is contemplated. The payment card provider account system 20 may also enable authorization the transaction. For example, the notification received by the user 14 may include checkboxes, a drop down list, buttons, text boxes, or other functionality to enable authorization of the transaction. Once the transaction is authorized or declined, an indication of the user's action is sent back to the payment card provider account system 20. Based on the indication, the payment card provider account system 20 may authorize or deny the transaction. The payment card provider account system 20 may then send an indication of the authorization or denial to the payment card transaction device 18. In this manner, the user 14 may stop a suspicious transaction as it is occurring, rather than after it has occurred.

Figure 2:
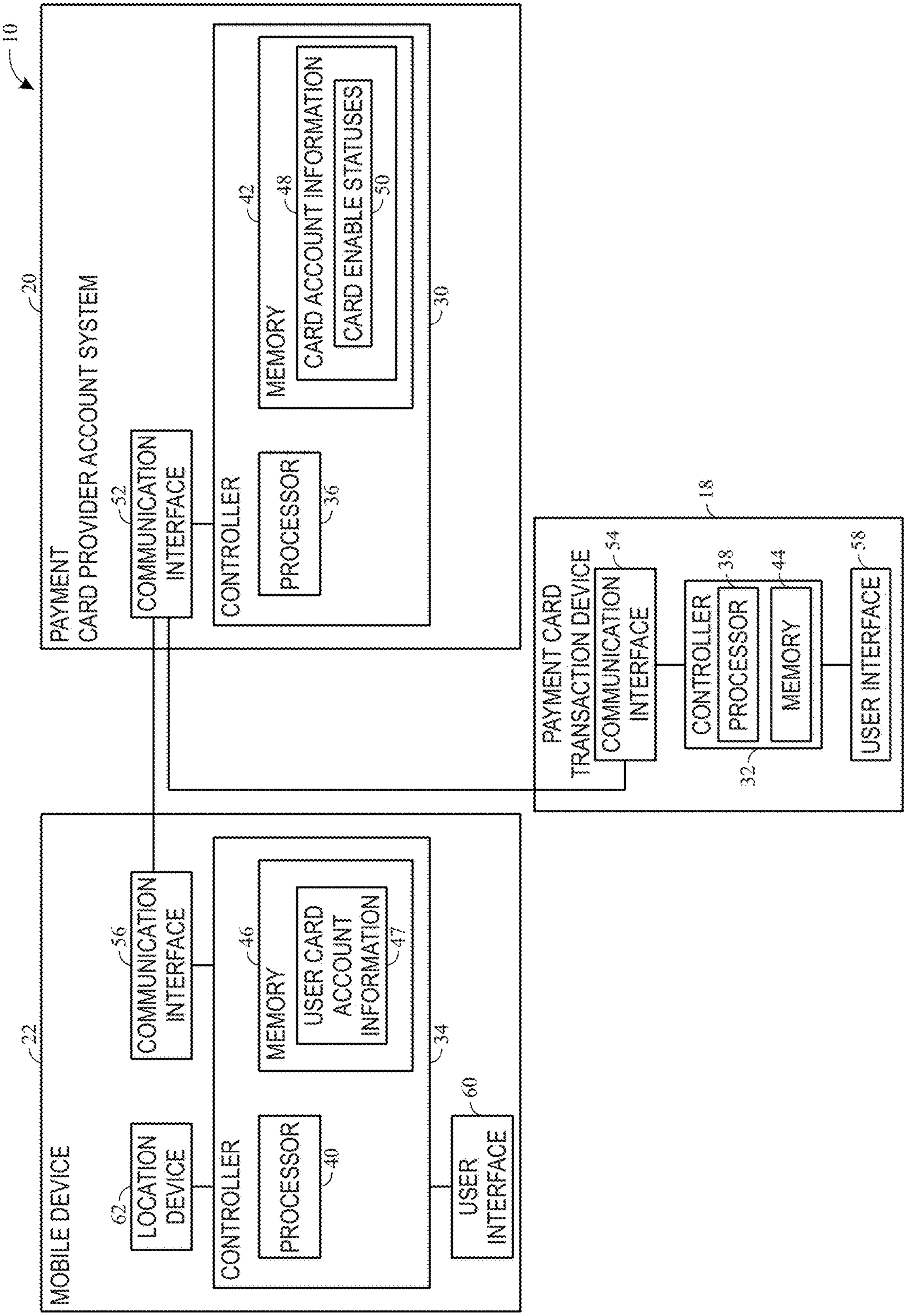
FIG. 2 is a block diagram of the payment card security system of FIG. 1, in accordance with an embodiment of the present disclosure.

FIG. 2 is a block diagram of the payment card security system 10 of FIG. 1, in accordance with an embodiment of the present disclosure. The payment card security system 10 includes the payment card provider account system 20, the payment card transaction device 18, and the mobile device 22 of the user 14. In some embodiments, the payment card transaction device 18 may be a dedicated payment card transaction device, such as a POS terminal in a physical store. In alternative embodiments, the payment card transaction device 18 may be a communication device that enables the user 14 to perform transactions (e.g., online transactions), such as a mobile device of the user 14 (including the mobile device 22).

Each of the payment card provider account system 20, the payment card transaction device 18, and the mobile device 22 may include a respective controller 30, 32, 34 that includes one or more respective processors 36, 38, 40 and one or more respective memory devices 42, 44, 46. The one or more processors 36, 38, 40 (e.g., microprocessors) may execute software programs and/or instructions relating to payment card transactions. Moreover, the one or more processors 36, 38, 40 may include multiple microprocessors, one or more "general-purpose" microprocessors, one or more special-purpose microprocessors, and/or one or more application specific integrated circuits (ASICS), or some combination thereof. For example, the one or more processors 36, 38, 40 may include one or more reduced instruction set (RISC) processors. The one or more memory devices 42, 44, 46 may store information such as control software, look up tables, configuration data, etc. In some embodiments, the one or more processors 36, 38, 40 and/or the one or more memory devices 42, 44, 46 may be external to the respective controllers 30, 32, 34. The one or more memory devices 42, 44, 46 may include a tangible, non-transitory, machine-readable-medium, such as a volatile memory (e.g., a random access memory (RAM)) and/or a nonvolatile memory (e.g., a read-only memory (ROM)). The one or more memory devices 42, 44, 46 may include one or more storage devices (e.g., nonvolatile storage devices) that may include read-only memory (ROM), flash memory, a hard drive, and/or any other suitable optical, magnetic, or solid-state storage medium.

The one or more memory devices 42, 44, 46 may store a variety of information and may be used for various purposes. For example, the one or more memory devices 42, 44, 46 may store machine-readable and/or processor-executable instructions (e.g., firmware or software) for the one or more processors 36, 38, 40 to execute, such as instructions relating to payment card transactions. In particular, the one or more memory devices 42 of the payment card provider account system 20 may store card account information 48 (e.g., account numbers, account holder names, billing addresses, account histories, account holder contact information, and the like) for each payment card 12 issued by the payment card provider. The card account information 48 may also include card enablement statuses 50 that indicate whether each payment card 12 is enabled or disabled. In some embodiments, the one or more memory devices 46 of the mobile device 22 may store user card account information 47. The user card account information 47 may include sufficient information to identify the user's account with the payment card provider account system 20 (e.g., account number, account holder name, billing address, account holder contact information, and the like). In some embodiments, the user card account information 47 may include a user card enablement status 50 that indicates whether the user's payment card 12 is enabled or disabled.

Each of the payment card provider account system 20, the payment card transaction device 18, and the mobile device 22 may also include a respective communication interface 52, 54, 56 communicatively coupled to the respective controllers 30, 32, 34 that enables the respective controllers 30, 32, 34 to communicate with any suitable communication network. For example, the communication interface 52, 54, 56 may enable the controllers 30, 32, 34 to communicate with wireless networks (e.g., mobile, WiFi, LAN, WAN, Internet, and the like). In this manner, the communication interfaces 52, 54, 56 may enable the controllers 30, 32, 34 to communicate with each other.

Each of the payment card transaction device 18 and the mobile device 22 may include a respective user interface 58, 60 communicatively coupled to the respective controllers 32, 34 that enables the respective controllers 32, 34 to display output and/or receive input from the user 14. For example, the user interface 58 of the payment card transaction device 18 may include any suitable input and output devices, such as a display, a touchscreen, a stylus, a keypad, a card reader, and the like, to enable the user 14 to perform a transaction. The user interface 58 of the mobile device 22 may also include any suitable input and output devices, such as a display, a touchscreen, a stylus, a keypad, buttons, a camera, and the like, to enable the user 14 to send and receive data.

The mobile device 22 may also include a location device 62 communicatively coupled to the controller 34 that enables the controller 34 to determine a location of the mobile device 22. For example, the location device 62 may receive global positioning system (GPS) signals, a different type of GPS-related signal, or other signals of another location protocol that determine the location of the mobile device 22.

Figure 3:
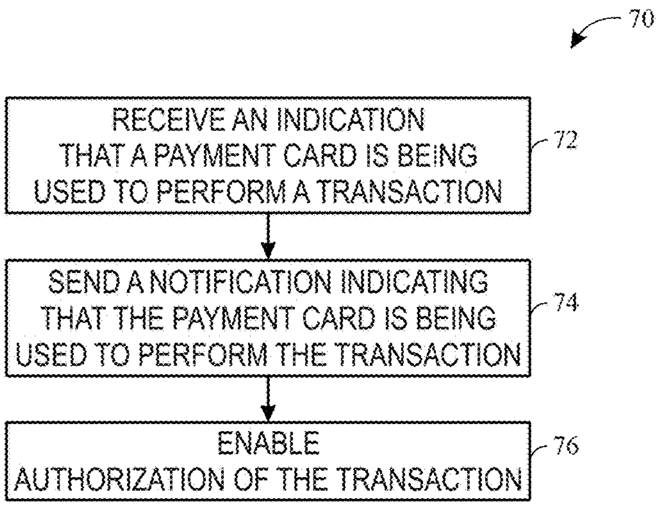
FIG. 3 is a flowchart illustrating a method for enabling authorization of a transaction, in accordance with an embodiment of the present disclosure.

FIG. 3 is a flowchart illustrating a method 70 for authorization of a transaction while the transaction is occurring, in accordance with an embodiment of the present disclosure. The method 70 may be performed by any suitable device that may control components of the payment card provider account system 20, such as the controller 30 of FIG. 2. While the method 70 is described using steps in a specific sequence, it should be understood that the present disclosure contemplates that the described steps may be performed in different sequences than the sequence illustrated, and certain described steps may be skipped or not performed altogether. In some embodiments, the method 70 may be implemented by executing instructions stored in a tangible, non-transitory, computer-readable medium, such as the one or more memory devices 42, using a processor, such as the one or more processors 36.

As illustrated, the controller 30 receives (block 72) an indication that the payment card 12 is being used to perform a transaction. For example, the payment card transaction device 18 may send the indication to the payment card provider account system 20 that the transaction is being performed. In some embodiments (e.g., in the case of an online transaction), the transaction may be performed by a mobile device, such as the mobile device 22. As such, the mobile device 22 may send the indication to the payment card provider account system 20. The indication may include an authorization and/or authentication request for using the payment card 12 or an account associated with the payment card 12.

The controller 30 then sends (block 74) a notification to the user 14 that the payment card 12 is being used to perform the transaction. For example, the controller 30 may send the notification via the communication interface 52 to the mobile device 22 in response to receiving the indication that the payment card 12 is being used to perform the transaction. The notification may include a text message (e.g., via short message service (SMS)), an email, an alert or message provided via an application running on the mobile device 22, and the like.

In some embodiments, the user 14 may opt-in or opt-out as to whether the notification is sent. For example, the user 14 may modify a setting on the payment card provider's website or the payment card provider's application (e.g., running on the mobile device 22) that enables or disables the notification. Additionally, in further embodiments, the user 14 may modify under what conditions the notification is sent. The conditions may be related to an amount of the transaction, a geographical range or area that the transaction is occurring, a cardholder identity, a merchant identity, or any other suitable criteria. For example, the user 14 may set a threshold amount of a transaction (e.g., $50), such that if the transaction exceeds the threshold amount, then the notification is sent. Similarly, the user 14 may set a threshold geographical range (e.g., 20 miles) for the transaction from a location (e.g., the user location, the billing address, a predefined location set by the user, or any other suitable location), such that if the location that the transaction is occurring exceeds the threshold geographical range, then the notification is sent. In some circumstances, the user 14 may enable other users to also use the card (e.g., family members). If the payment card 12 includes a certain cardholder (e.g., the user's teenage son) in addition to the user 14 (or accountholder), then the notification is sent. In another example, the user 14 may provide a list of preferred merchants or vendors, such that the notification is sent only if the transaction does not involve a preferred merchant. Similarly, the user 14 may provide a list of suspicious or undesirable merchants or vendors, such that the notification is sent if the transaction involves an undesirable merchant. Moreover, these criteria may be combined. For example, the user 14 may set notifications to be sent in the case that the cardholder identity is the user's teenage son and the threshold amount exceeds $20. It should be noted that the criteria discussed above is merely exemplary, and any suitable criteria that may relate to when the user 14 may want to be notified relating to a transaction is contemplated.

The controller 30 enables (block 76) authorization of the transaction. In some embodiments, the notification may include functionality to authorize the transaction. For example, the notification may include checkboxes, a drop down list, buttons, text boxes, or any other suitable functionality to enable authorization (e.g., the user 14 to accept or decline) the transaction. In alternative embodiments, the controller 30 may send a message in addition to the notification that enables authorization of the transaction. In some instances, the notification may inform the user 14 that the user 14 may accept or decline the transaction by sending a message to the payment card provider account system 20 (e.g., via text message, email, or an application running on the mobile device 22) that expressly accepts or declines the transaction. It should be noted that the above-described functionality used to authorize the transaction is exemplary, and any suitable functionality to enable authorization of the transaction is contemplated.

If the user 14 declines the transaction, the transaction is not completed, and any appropriate follow-up actions may be implemented. For example, the controller 30 may send an alert to the merchant that the transaction is declined and inappropriate use of the payment card 12 is suspected. The controller 30 may send an alert to the payment card provider, fraud investigation or prevention groups, and/or law enforcement agencies indicating that suspicious activity involving the payment card 12 is suspected. If the user 14 authorizes the transaction, the transaction is completed. In this manner, the user 14 may stop a suspicious transaction as it is occurring, rather than after it has occurred.

Figure 4:
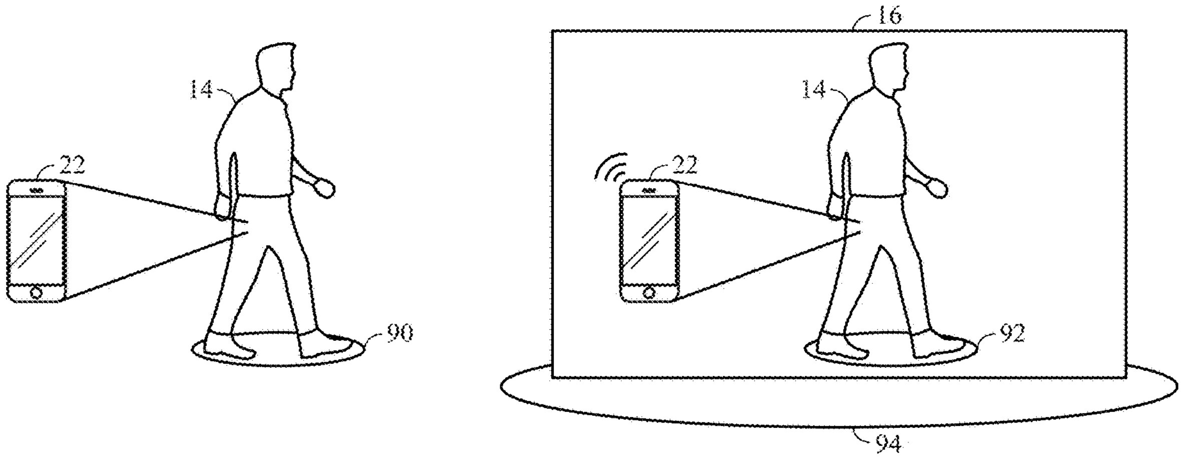
FIG. 4 is a diagram of locations of a user in relation to a store when the user has temporarily disabled a payment card, in accordance with an embodiment of the present disclosure.

In some circumstances, the user 14 may choose to disable (e.g., temporarily) the payment card 12. For example, the user 14 may choose to avoid exceeding a threshold balance on the payment card 12, or want to use an alternative payment card. As such, the user 14 may desire notifications from the payment card provider account system 20 that inform the user 14 that the payment card 12 is disabled when it appears the user 14 may use the payment card 12. For example, FIG. 4 is a diagram of locations of the user 14 in relation to the grocery store 16 when the user 14 has temporarily disabled the payment card 12, in accordance with an embodiment of the present disclosure. The controller 30 may be configured to send a notification (e.g., to the mobile device 22) that the payment card 12 is disabled when the controller 30 receives an indication that the user 14 (e.g., via the mobile device 22) is located inside a building in which the user 14 may use the payment card 12. At a first location 90, the user 14 is outside, not inside the grocery store 16. The mobile device 22 may determine that it is not inside the grocery store 16 via the location device 62. In some embodiments, the mobile device 22 may include instructions (e.g., stored in the one or more memory devices 46) to notify the payment card provider account system 20 when the mobile device 22 determines it is located in a building (e.g., the grocery store 16) in which the user 14 could attempt to use the payment card 12. As such, the mobile device 22 does not notify the payment card provider account system 20 since the mobile device 22 is not inside the grocery store 16.

At a second location 92, the user 14 is inside the grocery store 16. The mobile device 22 may determine that it is inside the grocery store 16 via the location device 62. As a result, the mobile device 22 may notify the payment card provider account system 20. The payment card provider account system 20 may determine that the payment card 12 is disabled by checking the card enablement status 50 of the payment card 12. The payment card provider account system 20 may then send a notification to the mobile device 22 to inform the user 14 that the payment card 12 is disabled. The notification may include a text message (e.g., via short message service (SMS)), an email, an alert or message provided via an application running on the mobile device 22, and the like. In some embodiments, the card enablement status 50 of the payment card 12 may be stored instead on the mobile device 22 (e.g., in the user account information 47), and the mobile device 22 may simply check its own one or more memory devices 46 rather than notifying the payment card provider account system 20. The mobile device 22 may then provide an alert or message (e.g., via an application running on the mobile device 22) to the user 14 that the payment card 12 is disabled. In this manner, the user 14 may avoid the inconvenience and possible embarrassment of a rejected transaction using the disabled payment card 12.

In some embodiments, the notification may be sent when the user 14 is within a threshold proximity 94 (e.g., 50 feet) from the grocery store 16. Moreover, it should be understood that the grocery store 16 is only an example, and any suitable location that the user 14 may use the payment card 12 is contemplated (e.g., a gas station, a retail store, an entertainment venue, and the like). Additionally, in some embodiments, rather than location, the mobile device 22 may instead determine that the user 14 may perform or is likely to perform an online transaction. For example, if the user 14 opens a website that enables transactions (e.g., a website of a retail store, an online auction website, an online shopping website, and the like) or an application (e.g., on the mobile device 22) that enables transactions, the payment card provider account system 20 may send the notification to the mobile device 22 to inform the user 14 that the payment card 12 is disabled.

Figure 5:
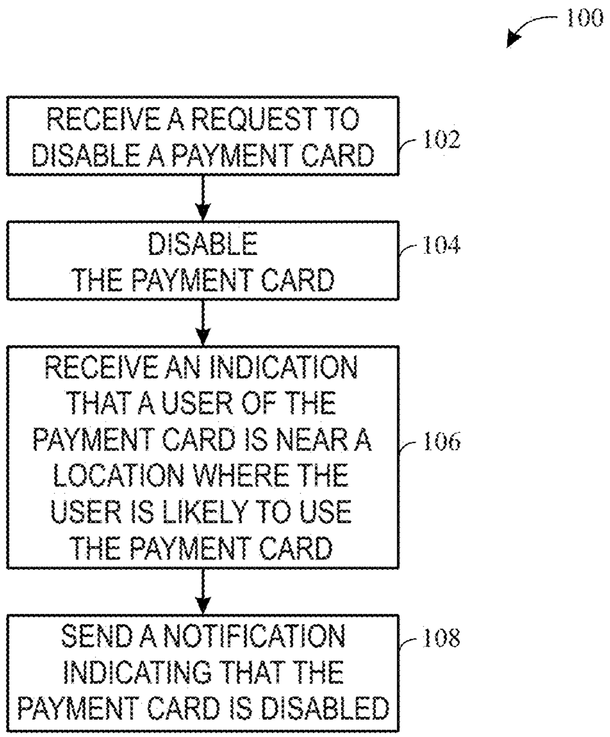
FIG. 5 is a flowchart illustrating a method for enabling the user to receive an indication that the payment card of FIG. 4 is disabled, in accordance with an embodiment of the present disclosure.

FIG. 5 is a flowchart illustrating a method 100 for enabling the user 14 to receive an indication that the payment card 12 of FIG. 4 is disabled, in accordance with an embodiment of the present disclosure. The method 100 may be performed by any suitable device that may control components of the payment card provider account system 20, such as the controller 30 of FIG. 2. While the method 100 is described using steps in a specific sequence, it should be understood that the present disclosure contemplates that the described steps may be performed in different sequences than the sequence illustrated, and certain described steps may be skipped or not performed altogether. In some embodiments, the method 100 may be implemented by executing instructions stored in a tangible, non-transitory, computer-readable medium, such as the one or more memory devices 42, using a processor, such as the one or more processors 36.

As illustrated, the controller 30 receives (block 102) a request to disable the payment card 12. For example, the user 14 may send the request via a website of the payment card provider or an application of the payment card provided (e.g., running on the mobile device 22). The user 14 may request that the disabling is temporary (e.g., for a fixed time period). In some embodiments, the user 14 may disable the payment card 12 only for certain payments, certain vendors, certain cardholders, certain geographical ranges or areas, and the like. Similarly, the user 14 may disable the payment card 12 for all transactions except for certain payments, certain vendors, certain cardholders, certain geographical ranges or areas, and the like.

The controller 30 may then disable (block 104) the payment card 12. As such, if the user 14 (or any other entity) attempts to perform a transaction using the payment card 12 (e.g., using account information associated with the payment card 12 via an online transaction), the transaction will be declined by the payment card provider account system 20.

The controller 30 may receive (block 106) an indication that the user 14 is near a location (e.g., the grocery store 16) where the user 14 may use or is likely to use the payment card 12. For example, the controller 30 may receive the indication when the user 14 is near a location at which the payment card 12 may be used to attempt to perform a transaction. The location may include any suitable location at which the user 14 may attempt to use the payment card 12. Examples may include a gas station, a retail store, an entertainment venue, and the like.

The controller 30 may then send (block 108) a notification to the mobile device 22 indicating that the payment card 12 is disabled. The user 14 may opt-in or opt-out to receiving the notification. In some embodiments, the one or more memory devices 42, 46 of the payment card provider account system 20 or of the mobile device 22 may store locations that the user 14 has performed transactions. The controller 30 may be configured (e.g., by the user 14 or the payment card provider) to only send the notification when the user 14 is at or near these stored locations. In this manner, the user 14 may avoid the inconvenience and possible embarrassment of a rejected transaction using the disabled payment card 12.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A system, comprising:

memory storing instructions; and a processing system that, when executing the instructions, is configured to:

receive, via input from a user interface associated with an account number, one or more merchant identities associated with a request to authorize a transaction;

store, in an association with the account number, the one or more merchant identities;

receive a first indication that a pending transaction is being performed with a merchant using the account number and a transaction location associated with the pending transaction;

receive account holder information associated with the account number, wherein the account holder information comprises the one or more merchant identities and indicates a mobile device;

determine whether the merchant corresponds to the one or more merchant identities and whether the transaction location is within a threshold distance of a location associated with the mobile device;

send a request to authorize the pending transaction to the mobile device based on the pending transaction, the transaction location being greater than the threshold distance from the location associated with the mobile device, and the merchant corresponding to the one or more merchant identities;

receive authorization from the mobile device in response to sending the request; and authorize the pending transaction based on the authorization from the mobile device.

2. The system of claim 1, wherein the first indication comprises a merchant name, a location associated with the merchant, an internet domain, or any combination thereof.

3. The system of claim 1, wherein the one or more merchant identities comprises an unauthorized merchant identity, and wherein the processing system is configured to send the request to authorize the pending transaction based at least in part on the merchant corresponding to the unauthorized merchant identity.

4. The system of claim 1, wherein the one or more merchant identities comprises one or more authorized merchant identities, and wherein the processing system is configured to send the request to authorize the pending transaction based at least in part on the merchant not corresponding to the one or more authorized merchant identities.

5. The system of claim 1, wherein the processing system, when executing the instructions, is configured to:

receive a second indication to decline the pending transaction from the mobile device associated with the account number; and decline the pending transaction based on the second indication.

6. The system of claim 1, wherein the processing system, when executing the instructions, is configured to send the request to authorize the pending transaction to the mobile device via text message, email, or an application executing on the mobile device.

7. The system of claim 1, wherein the processing system, when executing the instructions, is configured to send the request to authorize the pending transaction based at least in part on a cardholder identity associated with the pending transaction; an amount of the pending transaction; or both.

8. The system of claim 5, wherein the processing system, when executing the instructions, is configured to send an alert to the merchant associated with the pending transaction, a payment card provider associated with the pending transaction, a fraud investigation group, a fraud prevention group, a law enforcement agency, or any combination thereof, in response to receiving the second indication to decline the transaction.

9. The system of claim 1, wherein the processing system, when executing the instructions, is configured to set the threshold distance based on input from the mobile device.

10. The system of claim 1, wherein the location associated with the mobile device comprises a predefined location set by an account holder associated with the account number.

11. The system of claim 1, wherein the processing system, when executing the instructions, is configured to receive the location associated with the mobile device from a location device associated with the mobile device.

12. One or more tangible, non-transitory, machine-readable media, comprising machine-readable instructions that cause a processing system to:

receive, via input from a user interface associated with an account number, one or more merchant identities associated with a request to authorize a transaction;

store, in an association with the account number, the one or more merchant identities;

receive a first indication that a pending transaction is being performed with a merchant using the account number and a transaction location associated with the pending transaction;

receive account holder information associated with the account number, wherein the account holder information comprises the one or more merchant identities and indicates a mobile device;

determine whether the merchant corresponds to the one or more merchant identities and whether the transaction location is within a threshold distance of the merchant;

send a request to authorize the pending transaction to the mobile device based on the pending transaction, the transaction location being within the threshold distance of the merchant, and the merchant corresponding to the one or more merchant identities;

receive authorization from the mobile device in response to sending the request; and authorize the pending transaction based on the authorization from the mobile device.

13. The one or more tangible, non-transitory, machine-readable media of claim 12, wherein the one or more merchant identities comprises an unauthorized merchant identity, and wherein the machine-readable instructions cause the processing system to send the request to authorize the pending transaction based at least in part on the merchant corresponding to the unauthorized merchant identity.

14. The one or more tangible, non-transitory, machine-readable media of claim 12, wherein the one or more merchant identities comprise one or more authorized merchant identities, and wherein the machine-readable instructions cause the processing system to send the request to authorize the pending transaction based at least in part on the merchant not corresponding to the one or more authorized merchant identities.

15. The one or more tangible, non-transitory, machine-readable media of claim 12, wherein the machine-readable instructions cause the processing system to:

receive a second indication to decline the transaction from the mobile device associated with the account number; and decline the transaction based on the second indication.

16. The one or more tangible, non-transitory, machine-readable media of claim 15, wherein the machine-readable instructions cause the processing system to send an alert to the merchant associated with the pending transaction, a payment card provider associated with the pending transaction, a fraud investigation group, a fraud prevention group, a law enforcement agency, or any combination thereof, in response to receiving the second indication to decline the transaction.

17. A method, comprising:

receiving, at a processing system and via input from a user interface associated with an account number, one or more merchant identities associated with a request to authorize a transaction;

storing, via the processing system and in an association with the account number, the one or more merchant identities;

receiving, via the processing system, a first indication that a pending transaction is being performed with a merchant using the account number and a transaction location associated with the pending transaction;

receiving, via the processing system, account holder information associated with the account number, wherein the account holder information comprises the one or more merchant identities and indicates a mobile device;

determining, via the processing system, whether the merchant corresponds to the one or more merchant identities and whether the transaction location is within a threshold distance of the merchant;

sending, via the processing system, a request to authorize the pending transaction to the mobile device based on the pending transaction, the transaction location being within the threshold distance of the merchant, and the merchant corresponding to the one or more merchant identities;

receive authorization from the mobile device in response to sending the request; and authorize the pending transaction based on the authorization from the mobile device.

18. The method of claim 17, wherein the one or more merchant identities comprises an unauthorized merchant identity, the method comprising sending, via the processing system, the request to authorize the pending transaction based at least in part on the merchant corresponding to the unauthorized merchant identity.

19. The method of claim 17, wherein the one or more merchant identities comprise one or more authorized merchant identities, the method comprising sending, via the processing system, the request to authorize the pending transaction based at least in part on the merchant not corresponding to the one or more authorized merchant identities.

20. The method of claim 17, comprising:

receiving, via the processing system, a second indication to decline the transaction from the mobile device associated with the account number; and declining the pending transaction based on the second indication.

* * * * *